US012791725B2

(12) United States Patent
Shane

(10) Patent No.: US 12,791,725 B2
(45) **Date of Patent: *Nov. 10, 2026**

(54) SYSTEMS AND METHODS FOR DETECTING WATER ALONG DRIVING ROUTES

(71) Applicant: Kodiak Robotics, Inc., Mountain View, CA (US)

(72) Inventor: Laura W. Shane, Park City, UT (US)

(73) Assignee: Kodiak Robotics, Inc., Mountain View, CA (US)

(*) Notice: Subject to any disclaimer, the term of this patent is extended or adjusted under 35 U.S.C. 154(b) by 1073 days.

This patent is subject to a terminal disclaimer.

(21) Appl. No.: 17/937,927

(22) Filed: Oct. 4, 2022

(65) Prior Publication Data

US 2024/0118424 A1 Apr. 11, 2024

(51) Int. Cl.

| | |
|---|---|
| ***G01S 17/931*** | (2020.01) |
| ***B60W 30/14*** | (2006.01) |
| ***B60W 40/068*** | (2012.01) |
| ***G01S 17/89*** | (2020.01) |

(52) U.S. Cl.

CPC ......... *G01S 17/931* (2020.01); *B60W 30/143* (2013.01); *B60W 40/068* (2013.01); *G01S 17/89* (2013.01); *B60W 2420/408* (2024.01); *B60W 2552/40* (2020.02); *B60W 2555/20* (2020.02)

(58) Field of Classification Search

CPC .... G01S 17/931; G01S 17/89; B60W 30/143; B60W 40/068; B60W 2552/40; B60W 2555/40; B60W 2420/408

See application file for complete search history.

(56) References Cited

U.S. PATENT DOCUMENTS

| | | | | |
|---|---|---|---|---|
| 5,586,028 | A | 12/1996 | Sekine et al. | |
| 10,696,227 | B2 | 6/2020 | Stein | |
| 10,921,810 | B2 | 2/2021 | Kutila et al. | |
| 11,021,159 | B2 * | 6/2021 | Herman | B60W 30/146 |

(Continued)

FOREIGN PATENT DOCUMENTS

| | | | | |
|---|---|---|---|---|
| EP | 3779501 | B1 * | 6/2024 | G01S 7/4802 |
| JP | 2022139739 | A | 9/2022 | |

OTHER PUBLICATIONS

“Moist.” Merriam-Webster.com Dictionary, Merriam-Webster, https://www.merriam-webster.com/dictionary/moist. Accessed Nov. 12, 2025. (Year: 2025).*

(Continued)

*Primary Examiner* — Helal A Algahaim
*Assistant Examiner* — James W. Napier
(74) *Attorney, Agent, or Firm* — Fox Rothschild LLP

(57) ABSTRACT

Systems and methods for determining a presence of water along a surface from Light Detection and Ranging (LiDAR) point clouds is provided. The method comprises generating, using a LiDAR system coupled to a vehicle, at least one point cloud, wherein the LiDAR system comprises a processor, and, using the processor, identifying and isolating a ground plane within the at least one point cloud, identifying one or more objects within the at least one point cloud, determining whether a reflection of the one or more objects is present in the at least one point cloud below the ground plane, and, when the reflection is present, determining that water is present along a surface.

18 Claims, 7 Drawing Sheets

(56) References Cited

U.S. PATENT DOCUMENTS

| | | | | |
|---|---|---|---|---|
| 11,397,262 | B2 | 7/2022 | Gordon et al. | |
| 12,259,476 | B2 * | 3/2025 | Woll | G01S 17/931 |
| 2014/0307247 | A1 * | 10/2014 | Zhu | B60W 40/064 342/54 |
| 2016/0178802 | A1 * | 6/2016 | Stainvas Olshansky | G01S 17/95 356/445 |
| 2021/0397880 | A1 * | 12/2021 | Deng | G06T 7/70 |
| 2023/0069346 | A1 | 3/2023 | Zhu et al. | |
| 2024/0111057 | A1 | 4/2024 | Woll et al. | |
| 2024/0116513 | A1 | 4/2024 | Shane et al. | |
| 2024/0118424 | A1 | 4/2024 | Shane | |
| 2024/0182065 | A1 | 6/2024 | Grabe et al. | |

OTHER PUBLICATIONS

“Wet.” Merriam-Webster.com Dictionary, Merriam-Webster, https://www.merriam-webster.com/dictionary/wet. Accessed Nov. 12, 2025. (Year: 2025).*

* cited by examiner

SYSTEMS AND METHODS FOR DETECTING WATER ALONG DRIVING ROUTES

BACKGROUND

Field of the Disclosure

Embodiments of the present disclosure relate to water detection along a road surface and, in particular, to detecting water, and amounts of water, along a road surface and adjusting driving instructions for an autonomous vehicle accordingly.

Description of the Related Art

Typically, clean, dry road surfaces are ideal for maneuvering a vehicle along the road surface. When materials, such as water, snow, ice, oil, etc. are present on the road surface, that material can get between the road surface and the tires of a vehicle. This can decrease the traction of the tires against the road surface, which can make it more difficult for the vehicle to maneuver along the road surface.

In order to safely and efficiently navigate an environment and prevent possible collision, Self-driving or otherwise autonomous vehicles require the ability to be able to detect one or more road surface conditions within the environment of the vehicle. In order to detect these objects and potential hazards, autonomous vehicles (AVs) are often equipped with one or more types of environmental sensing technologies, such as, e.g., photographic imaging systems and technologies (e.g., cameras), radio detection and ranging (RADAR) systems and technologies, and Light Detection and Ranging (LiDAR) systems and technologies.

A LiDAR sensor is configured to emit light, which strikes material (e.g., objects) within the vicinity of the LiDAR sensor. Once the light contacts the material, the light is deflected. Some of the deflected light bounces back to the LiDAR sensor. The LiDAR sensor is configured to measure data pertaining to the light bounced back (e.g., the distance traveled by the light, the length of time it took for the light to travel from and to the LiDAR sensors, the intensity of the light returning to the LiDAR sensor, etc.). This data can then be used to generate a point cloud of some or all of the environment around the LiDAR sensor, generally recreating an object map of the objects within the environment.

When used on a vehicle, the LiDAR sensor can be used to detect one or more objects within the environment of the vehicle. Due to LiDAR's use of data points gathered using light that has bounced off of one or more objects, LiDAR's reliability, particularly pertaining to its use with autonomous vehicles, can be affected by various atmospheric conditions such as, e.g., rain and fog, because these conditions can absorb and reflect light, resulting in false readings pertaining to the presence and/or size of objects within the environment of the vehicle. Due to at least this shortfall, LiDAR is often used in conjunction with other technologies, such as photographic imaging systems and technologies and RADAR systems and technologies.

When it rains, the ability of a vehicle to stop within a desired distance is generally decreased, due to changes in the surface characteristics of the surface on which the vehicle is driving. People can generally gauge when they need to reduce the speed of a vehicle to maintain safe distances. Autonomous vehicles (AVs), however, do not have this perception ability.

Therefore, for at least these reasons, systems and methods for more accurately determining the presence or water, snow, oil, or other materials which affect the characteristics of a driving surface are needed.

SUMMARY

According to an aspect of the present disclosure, a method for determining a presence of water along a surface from Light Detection and Ranging (LiDAR) point clouds is provided. The method comprises generating, using a LiDAR system coupled to a vehicle, at least one point cloud, wherein the LiDAR system comprises a processor, and, using the processor, identifying and isolating a ground plane within the at least one point cloud, identifying one or more objects within the at least one point cloud, determining whether a reflection of the one or more objects is present in the at least one point cloud below the ground plane, and, when the reflection is present, determining that water is present along a surface.

According to various embodiments, the method further comprises, when the reflection is not present, determining that water is not present along the surface.

According to various embodiments, the one or more objects comprises one or more retroreflective signs.

According to various embodiments, the method further comprises, when water is present along the surface, reducing a speed of the vehicle.

According to various embodiments, the method further comprises, after reducing the speed of the vehicle, increasing the speed of the vehicle when water is no longer detected along the surface.

According to various embodiments, the surface is a road surface.

According to another aspect of the present disclosure, a system for determining a presence of water along a surface from LiDAR point clouds is provided. The system comprises a vehicle, and a LiDAR system, coupled to the vehicle, the LiDAR system comprising one or more LiDAR sensors, and a processor, configured to generate at least one point cloud, identify and isolate a ground plane within the at least one point cloud, identify one or more objects within the at least one point cloud, determine whether a reflection of the one or more objects is present in the at least one point cloud below the ground plane, and, when the reflection is present, determine that water is present along a surface.

According to various embodiments, the processor is further configured to, when the reflection is not present, determine that water is not present along the surface.

According to various embodiments, the one or more objects comprises one or more retroreflective signs.

According to various embodiments, the processor is further configured to, when water is present along the surface, reduce a speed of the vehicle.

According to various embodiments, the processor is further configured to, after reducing the speed of the vehicle, increase the speed of the vehicle when water is no longer detected along the surface.

According to various embodiments, the surface is a road surface.

According to yet another aspect of the present disclosure, a system is provided. The system comprises at least one LiDAR system, coupled to a vehicle, configured to generate one or more point clouds of an environment, and a computing device, comprising a processor and a memory, coupled to the vehicle, configured to store programming instructions that, when executed by the processor, cause the processor to identify and isolate a ground plane within the at least one point cloud, identify one or more objects within the at least one one point cloud, determine whether a reflection of the one or more objects is present in the at least one point cloud below the ground plane, and, when the reflection is present, determine that water is present along a surface.

According to various embodiments, the programming instructions are further configured, when executed by the processor, to cause the processor to, when the reflection is not present, determine that water is not present along the surface.

According to various embodiments, the one or more objects comprises one or more retroreflective signs.

According to various embodiments, the programming instructions are further configured, when executed by the processor, to cause the processor to, when water is present along the surface, reduce a speed of the vehicle.

According to various embodiments, the programming instructions are further configured, when executed by the processor, to, after reducing the speed of the vehicle, increase the speed of the vehicle when water is no longer detected along the surface.

According to various embodiments, the surface is a road surface.

DETAILED DESCRIPTION

Figure 1:
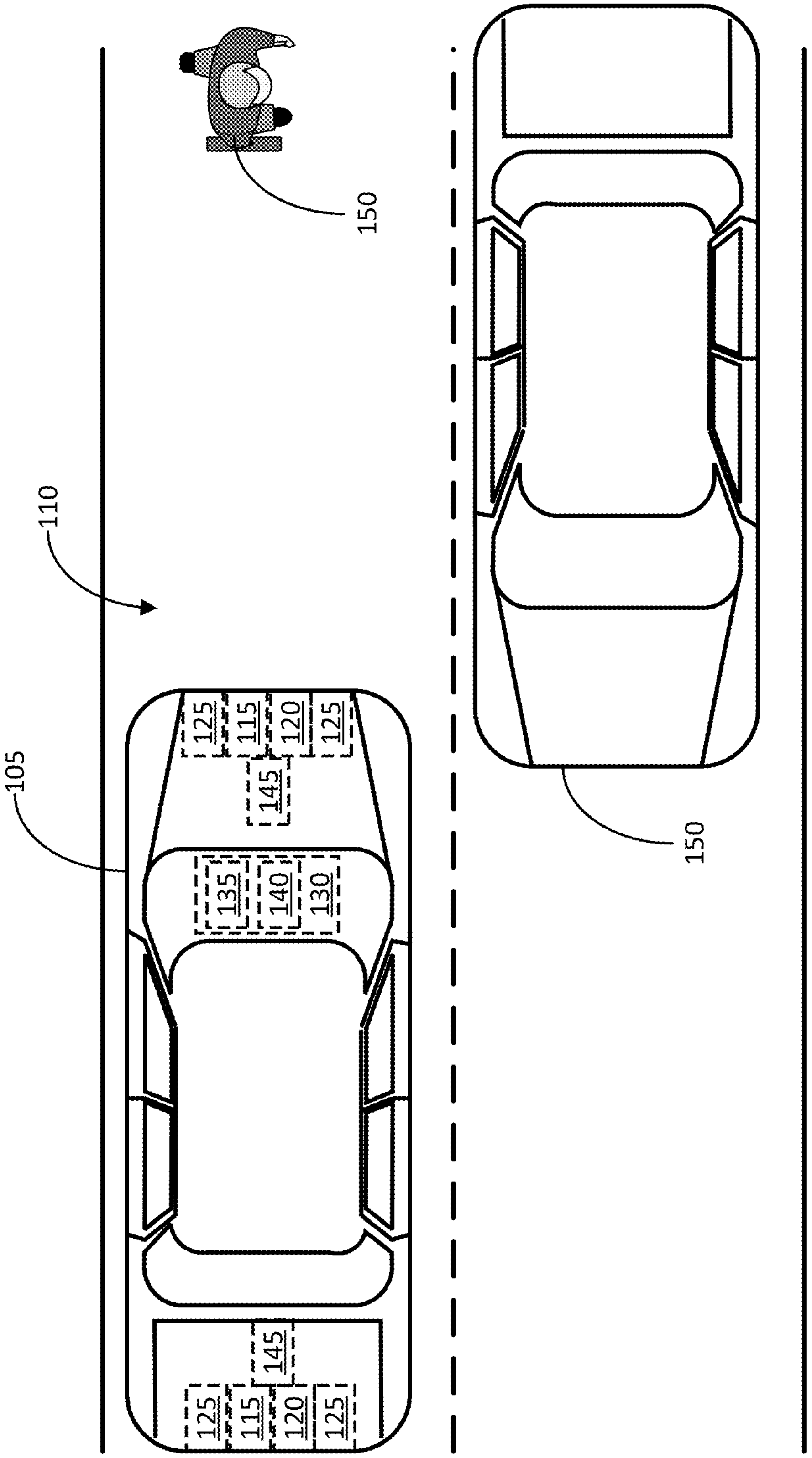
FIG. 1 illustrates an example Light Detection and Ranging (LiDAR)-equipped vehicle on a roadway, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for detecting water, and amounts of water, along a road surface, and adjusting driving instructions for an autonomous vehicle accordingly, according to embodiments of the present disclosure, will be described with reference to the accompanying drawings.

Referring now to FIG. 1, an example LiDAR-equipped vehicle 105 on a roadway 110 is shown, in accordance with various embodiments of the present disclosure.

According to various embodiments, the vehicle 105 comprises one or more sensors such as, for example, one or more LiDAR sensors 115, one or more radio detection and ranging (RADAR) sensors 120, and one or more cameras 125, one or more ultrasonic transducers 145, among other suitable sensors. According to various embodiments, the one or more sensors may be in electronic communication with one or more computing devices 130. The computing devices 130 may be separate from the one or more sensors and/or may be incorporated into the one or more sensors. The vehicle 105 may comprise a LiDAR system which comprises one or more LiDAR sensors 115 and/or one or more computing devices 130.

In the example of FIG. 1, the LiDAR sensor 115 may be configured to emit light, which strikes material (e.g., the roadway 110, one or more obstacles 150, rain, snow, etc.) within the environment of the vehicle 105. Once the light emitted from the LiDAR sensor 115 comes into contact with the material, the light is deflected. Some of the deflected light bounces back to the LiDAR sensor 115. The LiDAR sensor 115 may be configured to measure data pertaining to the light bounced back (for example, the distance traveled by the light, the length of time it took for the light to travel from and to the LiDAR sensor 115, the intensity of the light returning to the LiDAR sensor 115, and so on as understood by a person of ordinary skill). This data may then be used to generate a point cloud (i.e., data points, in a coordinate system, which represent locations of objects within an environment) of some or all of the environment around the vehicle 105, generally recreating an object map of the road surface of the roadway 110, obstacles 150 within the environment, and so on.

According to various embodiments, the LiDAR sensor 115 may be coupled to the vehicle 105 and may be configured to generate one or more point clouds of an environment surrounding the vehicle 105. The environment may fully surround the vehicle or may encompass a portion of the vehicle's 105 surroundings.

According to various embodiments, the computing device 130 may comprise a processor 135 and/or a memory 140. The memory 140 may be configured to store programming instructions that, when executed by the processor 135, are configured to cause the processor 135 to perform one or more tasks such as, e.g., generating the one or more point clouds, identifying a ground plane within a point cloud, identifying and isolating one or more road surface points within a point cloud, identifying one or more points within the point cloud below the ground plane, determine an intensity of a returning ultrasonic wave, determining whether rain is present within the environment and/or on the road surface, determining how much (if any) rain is present on the road surface, among other functions. According to various embodiments, the one or more road surface points indicate a road surface portion within an environment of the point cloud, and the one or more atmospheric condition points indicate one or more atmospheric conditions within an environment of the processed point cloud. The atmospheric conditions may include, e.g., rain, fog, smoke, smog, snow, dust, and/or other suitable forms of atmospheric conditions.

According to various embodiments, identifying and isolating the one or more atmospheric condition points may include identifying one or more high-intensity points and one or more low-intensity points, and a position for each of the one or more high-intensity point and each of the one or more low-intensity points, within the initial processed point cloud. An intensity score may be determined for each point in the initial processed point cloud. According to various embodiments, each of these intensity scores may be compared against an intensity threshold. The intensity threshold may be dynamic and/or predetermined.

According to various embodiments, each point in the initial processed point cloud having an intensity score above an intensity threshold may be classified as a high-intensity point, and each point in the initial processed point cloud having an intensity score below the intensity threshold may be classified as a low-intensity point. Thus, a point cloud may have low-intensity points, high-intensity points, and/or a mixture of high-intensity points and low-intensity points.

According to various embodiments, the processor 135 may be configured, for each of the one or more low-intensity points, to calculate a mean distance, within the point cloud, of the low-intensity point to one or more of the one or more high-intensity points. For each of the one or more low-intensity points, when the mean distance is greater than a threshold distance, the low-intensity point may be classified as an atmospheric condition point. The distance threshold may be dynamic and/or predetermined.

Figure 2:
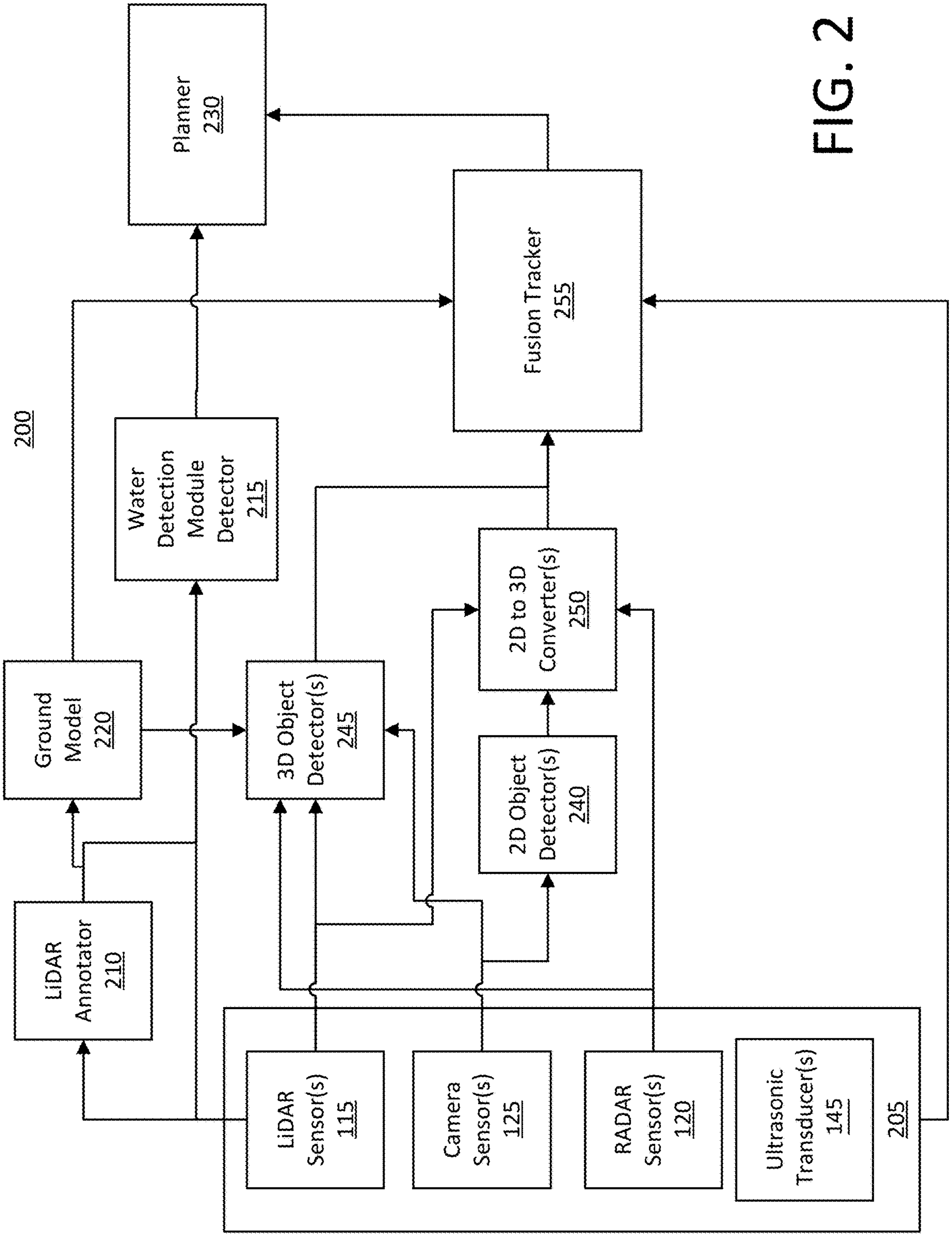
FIG. 2 is an example block diagram of a perception system of a vehicle, according to various embodiments of the present disclosure.

The vehicle 105 may include a perception system 200, such as shown, for example, in FIG. 2. The perception system 200 may be configured to aid the vehicle 105 in identifying/perceiving one or more one or more environmental characteristics (e.g., rain, snow, ice, oil, etc.) within the environment of the vehicle 105. According to various embodiments, the perception system 200 may be further configured to detect one or more reflections within the LiDAR point cloud.

According to various embodiments, the perception system 200 may include one or more sensors 205 including, for example, LiDAR sensors 115, RADAR sensors 120, cameras 125, etc. The one or more sensors 205 may be positioned at any suitable position or positions along a vehicle 105 (e.g., the front, sides, back, top, bottom, etc.).

According to various embodiments, the LiDAR sensor(s) 115 may be in electronic communication with one or more LiDAR annotation modules 210. A LiDAR annotation module 210 may be configured to annotate one or more point clouds for use in rain detection (using, for example, a water detection module 215) in the path, potential path, and/or environment of the vehicle 105.

According to various embodiments, the LiDAR annotators 210 may work in conjunction with a ground model 220 configured to model a ground portion of the one or more LiDAR point clouds. Ground portions of LiDAR point clouds are generally high-intensity, high-density points in the point cloud. The road surface points may be positioned along the ground portion.

According to various embodiments, the LiDAR sensor(s) 115 and/or the LiDAR annotation module 210 may provide data that can be analyzed by the water detection module 215 to detect water in the path, potential path, and/or environment of the vehicle 105. The detected water may then be sent to a planning module 230 for planning a trajectory of the vehicle 105, including any changes in direction, velocity, etc.

According to various embodiments, when identifying and/or isolating the one or more road surface points, the perception system 200 may be configured to compare the LiDAR point cloud against one or more secondary scans of the environment, such as, for example, one or more two-dimensional (2D) camera images of the environment, RADAR scans of the environment, and/or other suitable maps incorporating surface features of the road, and/or other suitable methods of determining a road surface, as understood by a person of ordinary skill. Alternatively, the LiDAR point cloud itself may be analyzed to determine the road surface. According to various embodiments, one or more of the LiDAR sensor(s) 115, the RADAR sensor(s) 120, and the camera sensor(s) 125 can supply data for analysis by a 2D object detection module 240 (for detecting objects in a 2D space) and/or a 3D object detection module 245 (for detecting objects in a 3D space). The 3D object detection module 245 may further be used for determining the road surface points within the point cloud. Additionally, 2D imagery may further be converted to 3D for 3D analysis, using a 2D to 3D converting module 250.

According to various embodiments, the data from the one or more sensors 205 and/or the data from the object detection modules 240, 245 may be sent to a fusion tracker module 255 configured to fuse data from multiple sensors and/or sensor types while keeping track of environmental factors (e.g., water, snow, ice, oil, etc.), objects, obstacles, road surface, and/or ground data from one cycle of analysis to another cycle of analysis. According to various embodiments, the fusion tracker module 255 may be configured to analyze previous sensor data analyses against new sensor data in order to maintain and/or modify environmental factor and/or object and/or obstacle data in order to improve environmental characteristic determination accuracy. The results of the fusion tracker module 255 may be sent to the planning module 230 for use in planning trajectories of the vehicle 105.

According to various embodiments, the LiDAR sensor 115 may be used to determine how wet a surface of the roadway 110 is. According to various embodiments, a LiDAR point cloud of the vehicle environment may be analyzed to determine a degree ofwetness along the road surface.

According to various embodiments, the number of zero intensity returns in the LiDAR point cloud along the road surface may correlate with a degree ofwetness along the road surface, and the degree ofwetness along the road surface may correlate with a decrease in speed for a planned trajectory of the AV. According to various embodiments, when the number of zero intensity returns within the road surface points is below a first threshold, the road surface is determined not to be wet. According to various embodiments, if the number of zero intensity returns is greater than the first threshold and below a second threshold, the road surface is determined to be wet, but that there is no accumulation of water along the road surface. According to various embodiments, when the number of zero intensity returns is greater than the second threshold but less than a third threshold, the road surface is determined to be wet, with streaming water present. According to various embodiments, when the number of zero intensity returns is greater than the third threshold, the road surface is determined to be wet, with flooding present.

For example, Table 1 illustrates an example determination of road surface (pavement) wetness and speed reduction based on the number of zero intensity returns.

TABLE 1

| Zero Intensity Returns | Pavement | Reduce Speed (the speed limit setpoint) by: |
|---|---|---|
| 0-10 | Not wet | 0 mph |
| 10-20 | Wet but no accumulation | 0 mph |
| 20-100 | Wet with streaming | 10 mph |
| 100+ | Wet with flooding | 25 mph |

For Table 1, a LiDAR point cloud analyzed at a sensitivity of approximately 905 nm was analyzed. Lidar, at 905 nm, reflects rain at the ground plane (e.g., along the road surface). It is noted, however, that other wavelengths may be used, while maintaining the spirit and functionality of the present disclosure. According to various embodiments, the speed of the vehicle may be decreased based on the degree ofwetness of the road surface.

According to various embodiments, water identification along a road surface may be determined via analysis of one or more reflections present within the LiDAR point cloud.

According to various embodiments, when a road surface is wet, the lidar point cloud may contain a reflection positioned under the ground plane of a retroreflective sign. This is because the beams angled towards the ground hit the film of water and reflect to the road sign and then back. Since objects cannot be positioned below the ground plane, these reflections can be identified, and their presence can be used to determine the presence of water on the road surface.

According to various embodiments, the vehicle 105 be configured to detect the presence of water and/or an amount of water along a road surface using the one or more ultrasonic transducers 145.

The intensity of reflected ultrasonic waves changes depending on the material off which the ultrasonic waves are reflected. Using this property of ultrasonic waves, judgements about the road surface a vehicle is driving on can be made using ultrasonic wave return data. For example, it can be determined whether there is rain (and how much rain) on a road surface and adjust a trajectory accordingly.

According to various embodiments, ultrasonic waves are generated by the one or more ultrasonic transducers 145. The ultrasonic waves, after striking one or more materials, are then reflected towards the one or more ultrasonic transducers 145, which are configured to measure the intensities of the ultrasonic waves returning to the one or more ultrasonic transducers 145.

Acoustic impedance between two or more materials can affect the amount of energy an ultrasonic wave has when returning to an ultrasonic transducer 145 and is dependent upon the properties of the material or materials through which the ultrasonic wave passes. The intensity of the reflection at an air/road interface should differ from that at an air/water interface.

An ultrasonic wave, passing through air and reflecting off a road surface to return back to the one or more ultrasonic transducers 145 will generally have a higher return frequency than an ultrasonic wave passing through air, then passing through water, then reflecting off of a road surface and returning to the one or more ultrasonic transducers 145. These differences in intensities can be used to detect the presence of water on a roadway.

According to various embodiments, the method or methods of determining whether water is present along a ground plane may be used to determine an area of the ground plane that is wet. According to various embodiments, the area of the ground plane that is wet may be proportional to an amount of water present along the ground plane. For example, it may be calculated that the greater the area of the ground plane that is wet, the greater the amount of water present along the ground plane.

Figure 3:
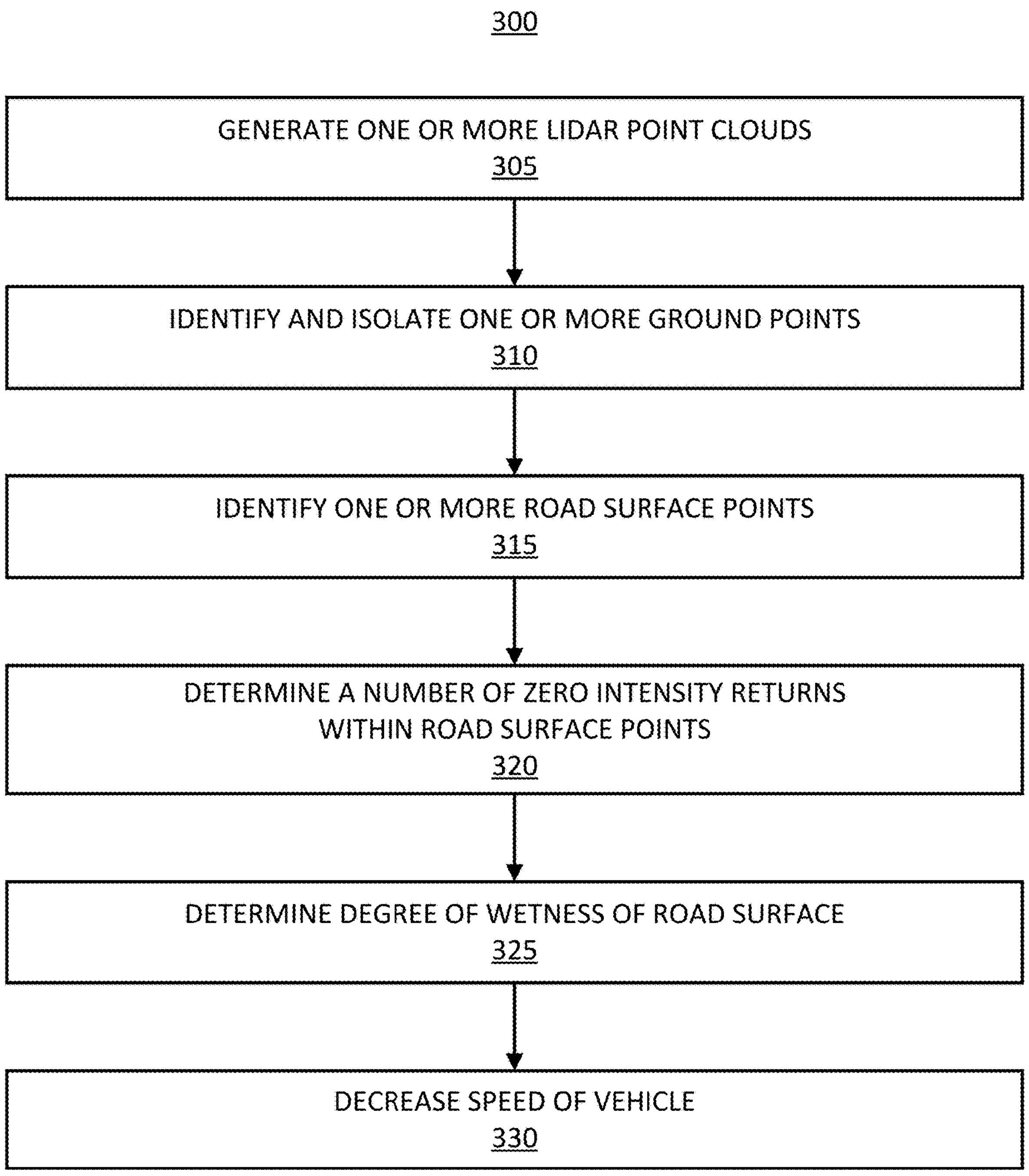
FIG. 3 is an example flowchart of a method for identifying a degree ofwetness of a road surface in a LiDAR point cloud, according to various embodiments of the present disclosure.

Referring now to FIG. 3, an example flowchart of a method 300 for identifying a degree ofwetness of a road surface in a LiDAR point cloud is described, in accordance with various embodiments of the present disclosure.

At 305, one or more LiDAR point clouds are generated, using a LiDAR system including one or more LiDAR sensors and at least one computer memory and computer processor. According to various embodiments, the one or more LiDAR point clouds are representative of all or part of a vehicle's surrounding environment. The LiDAR point cloud may, e.g., be from a combination of different types of LiDAR sensors. For example, scanning LiDAR sensors, spinning LiDAR sensors, flash LiDAR sensors, and/or other suitable types of LiDAR sensor may be combines in the LiDAR point cloud.

At 310, one or more ground points within the point cloud are identified and isolated and, at 315, one or more road surface points within the one or more ground points are identified. The one or more ground points and/or one or more road surface points are identified using any suitable means such as, e.g., analysis of the initial LiDAR point cloud against other sensor data (e.g., camera data, RADAR data, etc.), analysis of the LiDAR point cloud against analysis of one or more prior LiDAR point cloud analyses, analysis of points in the initial LiDAR point cloud for point intensity and/or point density (based on thresholds for determining intensity and/or density of known ground points), and/or other suitable means. According to various embodiments, the one or more ground points may indicate a ground portion within an environment of the point cloud.

According to various embodiments, the LiDAR point cloud analyzed at a sensitivity of approximately 905 nm and, at 320, a number of zero intensity returns within the road surface points is determined. At 325, a degree ofwetness of the road is determined based on the number of zero intensity returns. According to various embodiments, the number of zero intensity returns is proportional to an amount of water present along a ground plane.

According to various embodiments, when the number of zero intensity returns within the road surface points is below a first threshold, the road surface is determined not to be wet. According to various embodiments, if the number of zero intensity returns is greater than the first threshold and below a second threshold, the road surface is determined to be wet, but that there is no accumulation of water along the road surface. According to various embodiments, when the number of zero intensity returns is greater than the second threshold but less than a third threshold, the road surface is determined to be wet, with streaming water present. According to various embodiments, when the number of zero intensity returns is greater than the third threshold, the road surface is determined to be wet, with flooding present.

To aid in maintaining a safe speed of the vehicle, at 330, a speed of the vehicle is decreased based on the degree ofwetness of the road surface.

The friction factor of the road surface decreases with increasing amounts of water on the road. To try to maintain safe driving, vehicles should reduce speed when the friction factor decreases (e.g., with water levels along the surface of the road increase). There is a direct correlation between the amount of water on a road surface and the friction factor. A general determination in a decrease in velocity when a road surface is wet is illustrated by Equation 1.

$$V_{wet} = V_{dry}\sqrt{\frac{f_{wet}}{f_{dry}}} \quad \text{Equation 1}$$

Where $V_{dry}$ is the velocity of the vehicle when the road surface is dry, $V_{wet}$ is the velocity of the vehicle when the road surface is wet, $f_{dry}$ is the friction factor when the road surface is dry, and $f_{wet}$ is the friction factor when the road surface is wet.

For example, if the $f_{dry}$ is approximately 0.850 for dry pavement, and the $f_{wet}$ is approximately 0.6 for wet pavement, than the velocity for the vehicle on wet pavement would be $$V_{wet} = V_{dry}\sqrt{\frac{0.6}{0.850}} = 0.84(V_{dry}),$$

or 0.84 times the velocity of the vehicle on dry pavement.

According to various embodiments, Equation 1 could similarly be used in order to determine the velocity of a vehicle in the event of snow on the ground, using Equation 2, which swaps out the velocity when the ground surface is wet, $V_{wet}$, for the velocity when the ground surface has snow, $V_{snow}$, and swapping out the friction factor when the road surface is wet, $f_{wet}$, for the friction factor when the road surface is covered in snow, $f_{snow}$.

$$V_{snow} = V_{dry}\sqrt{\frac{f_{snow}}{f_{dry}}} \quad \text{Equation 2}$$

For example, if the $f_{dry}$ is approximately 0.850 for dry pavement, and the $f_{snow}$, is approximately 0.2 for pavement covered in snow, than the velocity for the vehicle on snow-covered pavement would be $$V_{snow} = V_{dry}\sqrt{\frac{0.2}{0.850}} = 0.49(V_{dry}),$$

or 0.49 times the velocity of the vehicle on dry pavement.

Figure 4:
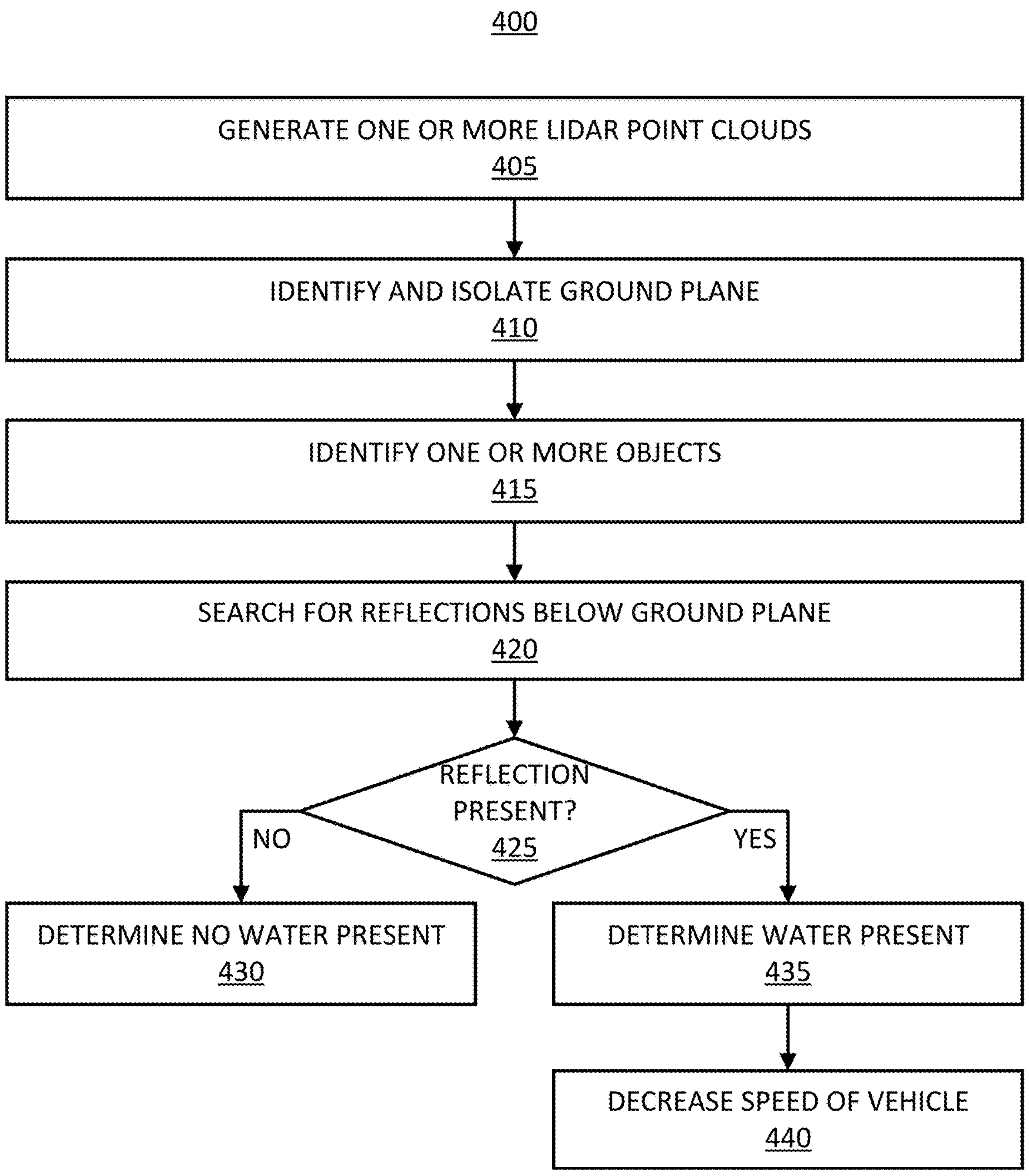
FIG. 4 is an example flowchart of a method for identifying water on a surface in a LiDAR point cloud, according to various embodiments of the present disclosure.

Referring now to FIG. 4, an example flowchart of a method 400 for identifying water on a surface in a LiDAR point cloud is described, in accordance with various embodiments of the present disclosure.

At 405, one or more LiDAR point clouds are generated, using a LiDAR system including one or more LiDAR sensors and at least one computer memory and computer processor. According to various embodiments, the one or more LiDAR point clouds are representative of all or part of a vehicle's surrounding environment. The LiDAR point cloud may, for example, be from a combination of different types of LiDAR sensors. For example, scanning LiDAR sensors, spinning LiDAR sensors, flash LiDAR sensors, and/or other suitable types of LiDAR sensor may be combined in the LiDAR point cloud.

At 410, a ground plane within the one or more LiDAR point clouds is identified and isolated, using any of the various means described herein and/or other suitable means. At 415, the one or more LiDAR point clouds are analyzed in order identify one or more objects (e.g., retroreflective signs) within the LiDAR point cloud. At 420, for one or more of the identified objects, the one or more LiDAR point clouds are analyzed to search for one or more reflections of the identified one or more objects positioned below the ground plane. At 425, it is determined whether the one or more reflections are present. If there is no reflection present, then, at 430, it is determined that no water is present. If there is a reflection present, then, at 435, it is determined that there is water present.

According to various embodiments, to aid in maintaining a safe speed of the vehicle, at 440, a speed of the vehicle is decreased based on the presence of water. According to various embodiments, the speed of the vehicle may be increased once water is no longer detected on the surface.

Figure 5:
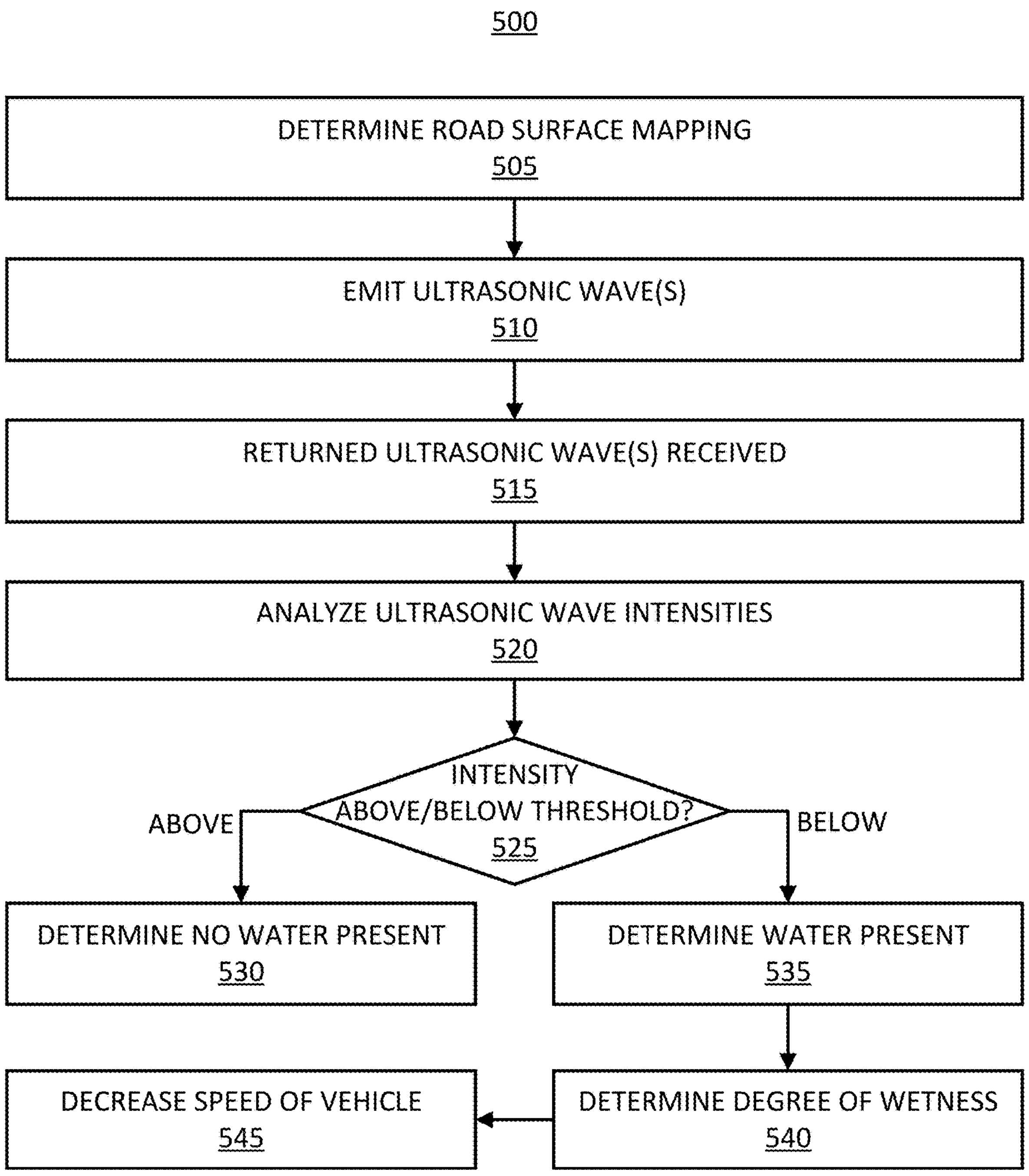
FIG. 5 is an example flowchart of a method for identifying water on a road surface via ultrasonic return intensity analysis, according to various embodiments of the present disclosure.

Referring now to FIG. 5, an example flowchart of a method 500 for identifying water on a road surface via ultrasonic return intensity analysis is described, in accordance with various embodiments of the present disclosure.

At 505, a road surface mapping within an environment of a vehicle is determined. According to various embodiments, the road surface may be determined by suitable means such as described above in methods 300, 400 and/or as shown in FIGS. 3 and 4.

At 510, one or more ultrasonic waves are emitted, via one or more ultrasonic transducers, in a direction of the road surface. At 515, the ultrasonic waves, after reflecting toward the one or more ultrasonic transducers from the road surface (i.e., one or more returned ultrasonic waves), are received by the one or more ultrasonic transducers.

At 520, an intensity of the one or more returned ultrasonic waves are analyzed and compared against intensities of ultrasonic waves which returned after passing through air before reflecting from the road surface. According to various embodiments, at 525, it is determined whether, for one or more of the returned ultrasonic waves, the intensity of the returned ultrasonic waves is above or below a threshold intensity.

When ultrasonic waves pass through water, the energies of the ultrasonic waves dissipate at a rate different from when ultrasonic waves pass through air. If the intensities of the returned ultrasonic waves are above the threshold intensity, then, at 530, a location at which the returned ultrasonic waves reflected off the road surface is determined not to have water present.

If the intensities of the returned ultrasonic waves are below the threshold intensity, then, at 535, the location at which the returned ultrasonic waves reflected off the road surface is determined to have water present.

According to various embodiments, at 540, a degree of wetness of the road surface is determined based on the intensities of the returned ultrasonic waves. For example, when the ultrasonic wave is emitted, the ultrasonic wave is reflected back toward the one or more ultrasonic transducers after making contact with a surface of the water. Based on characteristics from the reflected ultrasonic wave, a distance may be measured from the one or more ultrasonic transducers to the surface of the water. According to various embodiments, a portion of the emitted ultrasonic wave passes through the water and reflects off the ground surface back towards the one or more ultrasonic transducers. Based on characteristics from this reflected ultrasonic wave, a distance may be measured from the one or more ultrasonic transducers to the ground surface. Based on a difference in the distance from the surface of the water to the one or more ultrasonic transducers and the distance from the ground surface to the one or more ultrasonic transducers (and/or other suitable measurements such as, e.g., angle, intensity of the emitted ultrasonic wave, intensity of the reflected ultrasonic wave, etc.) a depth of the water along the ground surface may be measured.

To aid in maintaining a safe speed of the vehicle, at 545, a speed of the vehicle is decreased based on the degree of wetness of the road surface. According to various embodiments, the speed of the vehicle may be increased once water is no longer detected on the road surface.

Figure 6:
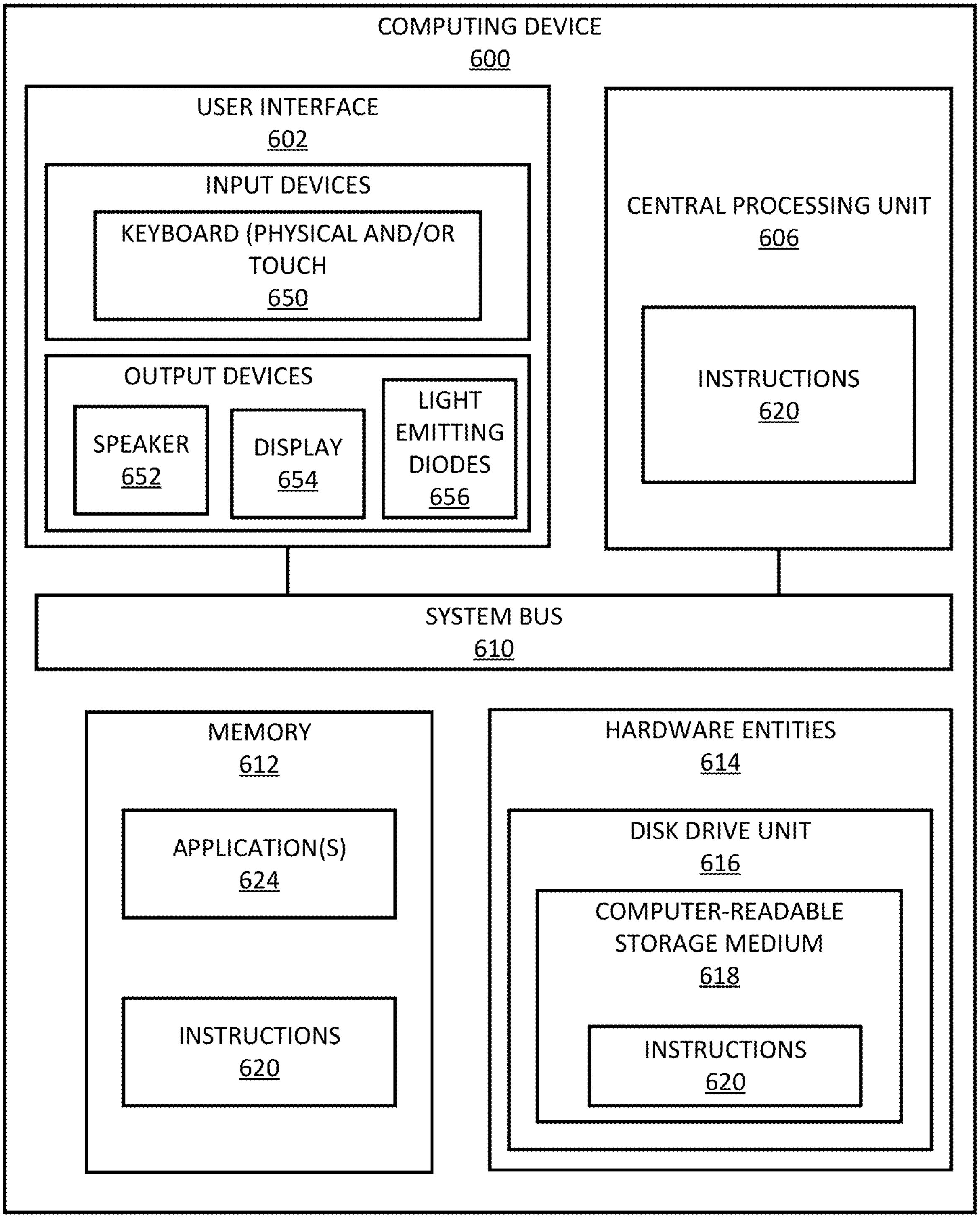
FIG. 6 illustrates example elements of a computing device, according to various embodiments of the present disclosure.

Referring now to FIG. 6, an illustration of an example architecture for a computing device 600 is provided. The computing device 130 of FIG. 1 may be the same as or similar to computing device 600. As such, the discussion of computing device 600 is sufficient for understanding the computing device 130 of FIG. 1, for example.

Computing device 600 may include more or less components than those shown in FIG. 1. The hardware architecture of FIG. 6 represents one example implementation of a representative computing device configured to one or more methods and means for filtering atmospheric conditions from LiDAR point clouds, as described herein. As such, the computing device 600 of FIG. 6 implements at least a portion of the method(s) described herein (for example, method 300 of FIG. 3, method 400 of FIG. 4, and/or method 500 of FIG. 5).

Some or all components of the computing device 600 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 6, the computing device 600 comprises a user interface 602, a Central Processing Unit ("CPU") 606, a system bus 610, a memory 612 connected to and accessible by other portions of computing device 600 through system bus 610, and hardware entities 614 connected to system bus 610. The user interface can include input devices and output devices, which facilitate user-software interactions for controlling operations of the computing device 600. The input devices include, but are not limited to, a physical and/or touch keyboard 650. The input devices can be connected to the computing device 600 via a wired or wireless connection (e.g., a Bluetooth® connection). The output devices include, but are not limited to, a speaker 652, a display 654, and/or light emitting diodes 656.

At least some of the hardware entities 614 perform actions involving access to and use of memory 612, which can be a Random Access Memory (RAM), a disk driver and/or a Compact Disc Read Only Memory (CD-ROM), among other suitable memory types. Hardware entities 614 can include a disk drive unit 616 comprising a computer-readable storage medium 618 on which is stored one or more sets of instructions 620 (e.g., programming instructions such as, but not limited to, software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution by the computing device 600 and that cause the computing device 600 to perform any one or more of the methodologies of the present disclosure.

Figure 7:
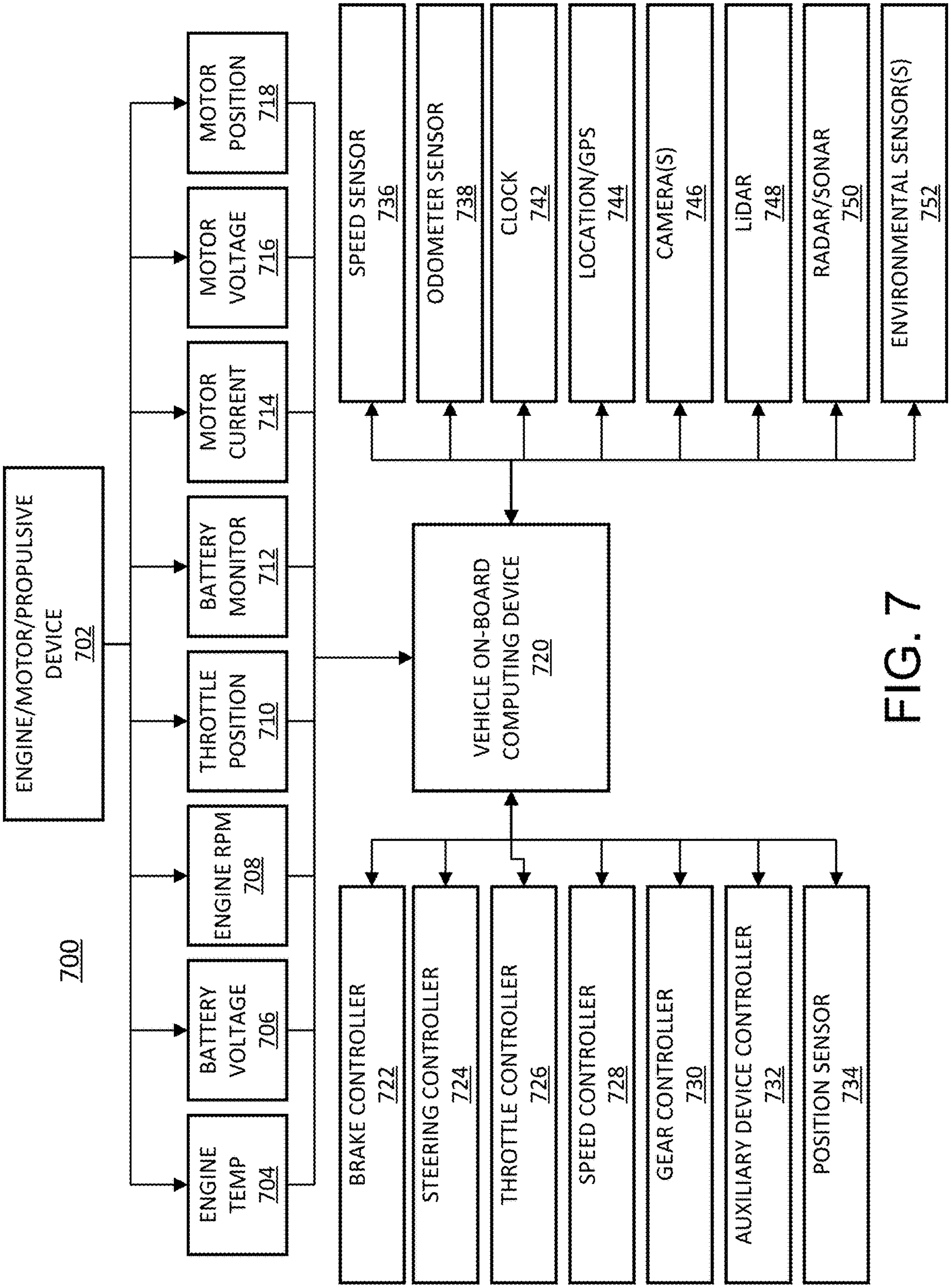
FIG. 7 illustrates example architecture of a vehicle, according to various embodiments of the present disclosure.

Referring now to FIG. 7, example vehicle system architecture 700 for a vehicle is provided, in accordance with various embodiments of the present disclosure.

Vehicle 105 of FIG. 1 can have the same or similar system architecture as that shown in FIG. 7. Thus, the foil discussion of vehicle system architecture 700 is sufficient for understanding vehicle 105 FIG. 1.

As shown in FIG. 7, the vehicle system architecture 700 includes an engine, motor or propulsive device (e.g., a thruster) 702 and various sensors 704-718 for measuring various parameters of the vehicle system architecture 700. In gas-powered or hybrid vehicles having a fuel-powered engine, the sensors 704-718 may include, for example, an engine temperature sensor 704, a battery voltage sensor 706, an engine Rotations Per Minute (RPM) sensor 708, and/or a throttle position sensor 710. If the vehicle is an electric or hybrid vehicle, then the vehicle may have an electric motor, and accordingly will have sensors such as a battery monitoring system 712 (to measure current, voltage and/or temperature of the battery), motor current 714 and voltage 716 sensors, and motor position sensors such as resolvers and encoders 718.

Operational parameter sensors that are common to both types of vehicles include, for example: a position sensor 734 such as an accelerometer, gyroscope and/or inertial measurement unit; a speed sensor 736; and/or an odometer sensor 738. The vehicle system architecture 700 also may have a clock 742 that the system uses to determine vehicle time during operation. The clock 742 may be encoded into the vehicle on-board computing device 720, it may be a separate device, or multiple clocks may be available.

The vehicle system architecture 700 also may include various sensors that operate to gather information about the environment in which the vehicle is traveling. These sensors may include, for example: a location sensor 744 (for example, a Global Positioning System (GPS) device); object detection sensors such as one or more cameras 746; a LiDAR sensor system 748; and/or a radar and/or a sonar system 750. The sensors also may include environmental sensors 752 such as a precipitation sensor and/or ambient temperature sensor. The object detection sensors may enable the vehicle system architecture 700 to detect objects that are within a given distance range of the vehicle 700 in any direction, while the environmental sensors 752 collect data about environmental conditions within the vehicle's area of travel.

During operations, information is communicated from the sensors to an on-board computing device 720. The on-board computing device 720 may be configured to analyze the data captured by the sensors and/or data received from data providers, and may be configured to optionally control operations of the vehicle system architecture 700 based on results of the analysis. For example, the onboard computing device 720 may be configured to control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location inform ad on may be communicated from the location sensor 744 to the on-board computing device 720, which may then access a map of the environment that corresponds to the location information to determine known fixed features of the environment such as streets, buildings, stop signs and/or stop/go signals. Captured images from the cameras 746 and/or object detection information captured from sensors such as LiDAR 748 is communicated from those sensors to the on-board computing device 720. The object detection information and/or captured images are processed by the on-board computing device 720 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for determining a presence of water along a surface from Light Detection and Ranging (LiDAR) point clouds, comprising: generating, using a LiDAR system coupled to a vehicle, at least one point cloud, wherein the LiDAR system comprises a processor; and using the processor: identifying and isolating a ground plane within the at least one point cloud; partitioning the point cloud data into an above ground plane data set and a below ground plane data set; identifying one or more retroreflective objects positioned above the ground plane within the above ground plane data set; determining whether a reflection of the one or more retroreflective objects, identified in the above ground plane data set, is present in the at least one point cloud below the ground plane data set; and when the reflection is present, determining that water is present along a surface.

2. The method of claim 1, further comprising, when the reflection is not present, determining that water is not present along the surface.

3. The method of claim 1, wherein the one or more objects comprises one or more retroreflective signs.

4. The method of claim 1, further comprising, when water is present along the surface, reducing a speed of the vehicle.

5. The method of claim 4, further comprising, after reducing the speed of the vehicle, increasing the speed of the vehicle when water is no longer detected along the surface.

6. The method of claim 1, wherein the surface is a road surface.

7. A system for determining a presence of water along a surface from Light Detection and Ranging (LiDAR) point clouds, comprising: a vehicle; and a LiDAR system, coupled to the vehicle, the LiDAR system comprising: one or more LiDAR sensors; and a processor, configured to: generate at least one point cloud; identify and isolate a ground plane within the at least one point cloud; partition the point cloud data into an above ground plane data set and a below ground plane data set; identify one or more retroreflective objects positioned above the ground plane within the above ground plane data set; determine whether a reflection of the one or more retroreflective objects, identified in the above ground plane data set, is present in the below ground plane data set; and when the reflection is present, determine that water is present along a surface.

8. The system of claim 7, wherein the processor is further configured to, when the reflection is not present, determine that water is not present along the surface.

9. The system of claim 7, wherein the one or more objects comprises one or more retroreflective signs.

10. The system of claim 7, wherein the processor is further configured to, when water is present along the surface, reduce a speed of the vehicle.

11. The system of claim 10, wherein the processor is further configured to, after reducing the speed of the vehicle, increase the speed of the vehicle when water is no longer detected along the surface.

12. The system of claim 7, wherein the surface is a road surface.

13. A system, comprising: at least one Light Detection and Ranging (LiDAR) system, coupled to a vehicle, configured to generate one or more point clouds of an environment; and a computing device, comprising a processor and a memory, coupled to the vehicle, configured to store programming instructions that, when executed by the processor, cause the processor to: identify and isolate a ground plane within the at least one point cloud; partition the point cloud data into an above ground plane data set and a below ground plane data set; identify one or more retroreflective objects positioned above the ground plane within the above ground plane data set;

determine whether a reflection of the one or more retroreflective objects, identified in the above ground plane data set, is present in the below ground plane data set; and when the reflection is present, determine that water is present along a surface.

14. The system of claim 13, wherein the programming instructions are further configured, when executed by the processor, to cause the processor to, when the reflection is not present, determine that water is not present along the surface.

15. The system of claim 13, wherein the one or more objects comprises one or more retroreflective signs.

16. The system of claim 13, wherein the programming instructions are further configured, when executed by the processor, to cause the processor to, when water is present along the surface, reduce a speed of the vehicle.

17. The system of claim 16, wherein the programming instructions are further configured, when executed by the processor, to, after reducing the speed of the vehicle, increase the speed of the vehicle when water is no longer detected along the surface.

18. The system of claim 13, wherein the surface is a road surface.

* * * * *